United States Patent
Yasui et al.

(10) Patent No.: US 7,286,324 B2
(45) Date of Patent: Oct. 23, 2007

(54) COBALT-PLATINUM OR IRON-PLANTINUM MAGNETIC MATERIAL CONTAINING 1% TO 40% CU, NI OR B

(75) Inventors: Nobuhiro Yasui, Kanagawa (JP);
Tohru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 515 days.

(21) Appl. No.: 10/813,005

(22) Filed: Mar. 31, 2004

(65) Prior Publication Data

US 2004/0196593 A1    Oct. 7, 2004

(30) Foreign Application Priority Data

Apr. 4, 2003    (JP) .............................. 2003-101110

(51) Int. Cl.
| | | |
|---|---|---|
| G11B 5/82 | (2006.01) | |
| G11B 5/66 | (2006.01) | |
| G11B 5/127 | (2006.01) | |
| G11B 5/33 | (2006.01) | |

(52) U.S. Cl. ....................... 360/135; 428/817
(58) Field of Classification Search ................. 360/135; 428/800, 817
See application file for complete search history.

(56) References Cited

U.S. PATENT DOCUMENTS

| | | | | |
|---|---|---|---|---|
| 4,109,287 | A * | 8/1978 | Kawai et al. ............. 428/846.4 |
| 5,851,688 | A * | 12/1998 | Chen et al. ................. 428/32.1 |
| 5,908,514 | A * | 6/1999 | Ranjan et al. ............ 428/836.1 |
| 6,007,623 | A * | 12/1999 | Thiele et al. ................... 117/95 |
| 6,602,620 | B1 * | 8/2003 | Kikitsu et al. ............. 428/842.2 |
| 6,623,857 | B2 * | 9/2003 | Watanabe et al. ............ 428/402 |
| 6,645,647 | B1 * | 11/2003 | Litvinov et al. ............. 428/830 |
| RE38,544 | E * | 7/2004 | Chen et al. ............... 204/192.2 |
| 6,852,431 | B2 * | 2/2005 | Fukutani et al. ............ 428/826 |
| 6,858,319 | B2 * | 2/2005 | Yasui et al. ................. 428/611 |
| 7,081,303 | B2 * | 7/2006 | Yasui et al. ................. 428/446 |
| 7,167,342 | B2 * | 1/2007 | Yasui et al. ................. 360/135 |
| 2001/0036563 | A1 | 11/2001 | Watanabe et al. ........ 428/694 T |

(Continued)

FOREIGN PATENT DOCUMENTS

JP    11-200090    7/1999

(Continued)

*Primary Examiner*—Angel Castro
*Assistant Examiner*—Christopher R. Magee
(74) *Attorney, Agent, or Firm*—Fitzpatrick, Cella, Harper & Scinto

(57) ABSTRACT

A CoPt- or FePt-alloy magnetic material in which a temperature to transform into an $L1_0$-ordered alloy is reduced and magnetic anisotropy energy is controlled, and a method for manufacturing the magnetic material are provided. In a CoPt- or FePt-alloy magnetic material obtained according to plating, at least one element of Cu, Ni and B is contained with an atomic percent equal to or more than 1% and equal to or less than 40%. A method for manufacturing a magnetic material includes a step of depositing a magnetic material in which at least one element of Cu, Ni and B is contained in a CoPt- or FePt-alloy magnetic material with an atomic percent equal to or more than 1% and equal to or less than 40%, from a plating solution, and a step of transforming the deposited magnetic material into an $L1_0$-ordered alloy according to annealing at a temperature equal to or lower than 500° C.

10 Claims, 5 Drawing Sheets

U.S. PATENT DOCUMENTS

| | | | |
|---|---|---|---|
| 2002/0086185 A1 | 7/2002 | Yasui et al. | 428/694 TS |
| 2003/0072971 A1 | 4/2003 | Fukutani et al. | 428/694 TS |
| 2004/0048092 A1 | 3/2004 | Yasui et al. | 428/542 |
| 2004/0191578 A1* | 9/2004 | Chen et al. | 428/694 TS |

FOREIGN PATENT DOCUMENTS

| | | |
|---|---|---|
| JP | 001-273622 | 10/2001 |
| WO | WO 03-069677 | 8/2003 |

\* cited by examiner

PLANE VIEW

CROSS-SECTIONAL VIEW
TAKEN ALONG LINE A-A'

41 MAGNETIC RECORDING MEDIUM
43 MAGNETIC HEAD
44 MAGNETIC HEAD DRIVING UNIT
45 SIGNAL PROCESSING UNIT
42 MAGNETIC-RECORDING-MEDIUM DRIVING UNIT

COBALT-PLATINUM OR IRON-PLANTINUM MAGNETIC MATERIAL CONTAINING 1% TO 40% CU, NI OR B

BACKGROUND OF THE INVENTION

1. Field of the Invention

The present invention relates to a magnetic material obtained by plating, a magnetic recording medium using the magnetic material, a magnetic recording/reproducing apparatus, an information reproducing apparatus, and a method for manufacturing the magnetic material.

2. Description of the Related Art

In accordance with a recent great increase in the amount of information processing, a large amount of capacity has been requested in an information recording technique using magnetic disk apparatuses, and the like. Particularly, in the field of hard disks, the amount of recorded information per unit area is increasing with a rate exceeding 60% per year. An increase in the amount of information recording is constantly being desired, and size reduction and high-density recording have been desired for portable recording apparatuses, and the like.

Conventional magnetic recording media for hard disks adopt a longitudinal magnetic recording method in which recording is performed so that a magnetic material is magnetized in a direction parallel to the surface of a disk. In such a longitudinal magnetic recording method, in accordance with high-density recording, in order to suppress a demagnetization field within a magnetic domain and cause a magnetic field to extract from above a recording medium so that a state of magnetization can be detected, it is necessary to reduce the thickness of a magnetic recording layer. As a result, the volume of a magnetic fine particle is extremely reduced, thereby a superparamagnetic effect becomes remarkable. That is, energy stabilizing the direction of magnetization is reduced by thermal energy, and recorded magnetization changes as the progress of time, thereby sometimes causing erasure of recording. Accordingly, studies of a perpendicular magnetic recording method in which a recording layer can have a large thickness have been intensively studied as a replacement for longitudinal magnetic recording.

A Co—Cr alloy is usually used for a recording layer 24 of a perpendicular magnetic recording medium shown in FIGS. 2A and 2B. As shown in FIG. 2B, when the recording layer 24 is formed according to sputtering, core portions 26 in which Co is rich, and shell portions 27 surrounding the corresponding core portions 26 in which Cr is relatively rich are grown by being separated from each other. The core portion 27 has a shape close to a cylinder and hard magnetism with a hexagonal close-packed structure (hereinafter abbreviated as a "hcp structure"), and serves as a recording portion. The shell portion 27 has a Cr-rich composition, and soft magnetism or a non-magnetic property, and has a role of weakening interaction between adjacent core portions. In the core portion 26, the c axis is perpendicular to the surface of a substrate 21, and magnetization is perpendicular to the surface of the substrate 21 according to crystallomagnetic anisotropy. At least one of Ta, Pt, Rh, Pd, Ti, Nb, Hf, and the like is added to the recording layer 24 in addition to Co—Cr.

However, in accordance with coming higher recording density, it is expected that provision of finer core portions 26 is difficult in a Co—Cr-type material. Furthermore, since the superparamagnetic effect is more pronounced in accordance with provision of finer core portions, a recently noticed $L1_0$-ordered alloy made of CoPt, FePt or FePd is considered to be a very promising material. Particularly, a medium obtained by providing fine $L1_0$-ordered alloy particles and dispersing the particles in a non-magnetic parent material to provide a film (a granular film) that can resist against a superparamagetic effect caused by fine Co—Cr magnetic particles has been proposed (Japanese Patent Application Laid-Open (Kokai) No. 2001-273622). However, it is also important to control the volume distribution of fine magnetic particles.

Because a glass substrate or the like is currently used, reduction of a temperature to transform into $L1_0$-ordered alloy made of CoPt, FePt or FePd is considered to be necessary and has been studied. Particularly, reduction of the temperature caused by addition of a third element to a FePt alloy is considered to be promising in film formation according to sputtering. However, studies about CoPt or FePt deposited from a plating solution are performed very little, and studies about additive elements are not yet performed.

SUMMARY OF THE INVENTION

In the above-described magnetic recording medium, reduction of a temperature to transform into an $L1_0$-ordered alloy made of CoPt, FePt or FePd is a problem to be solved.

It is an object of the present invention to reduce a temperature to transform into an $L1_0$-ordered alloy by adding a new element to a CoPt or FePt magnetic material deposited from a plating solution.

It is another object of the present invention to provide a CoPt- or FePt-alloy magnetic material in which magnetic anisotropy energy is controlled, and a method for manufacturing the material.

It is still another object of the present invention to provide a method for manufacturing the above-described magnetic material.

It is yet another object of the present invention to provide a magnetic recording medium including the above-described magnetic material.

It is yet a further object of the present invention to provide a magnetic recording/reproducing apparatus that uses a magnetic recording medium including the magnetic material.

It is still another object of the present invention to provide an information processing apparatus connected to a magnetic recording/reproducing apparatus that uses a magnetic recording medium including the magnetic material.

According to one aspect of the present invention, a magnetic material is a CoPt-alloy magnetic material or a FePt-alloy magnetic material obtained according to plating. At least one element of Cu, Ni and B is contained in the alloy magnetic material with an atomic percent equal to or more than 1% and equal to or less than 40%.

It is preferable that the CoPt or FePt alloy magnetic material obtained according to plating contains Ni, and at least one element of Cu and B with an atomic percent equal to or more than 1% and equal to or less than 30%. It is also preferable that the magnetic material is an $L1_0$-ordered alloy. It is also preferable the magnetic material has a coercive force equal to or more than 3 kOe.

According to another aspect of the present invention, a magnetic recording medium includes the above-described magnetic material filled in pores having a diameter equal to or less than 100 nm.

According to still another aspect of the present invention, a magnetic recording/reproducing apparatus uses the above-described magnetic recording medium.

According to yet another aspect of the present invention, an information processing apparatus, to which a magnetic recording/reproducing apparatus that uses the above-described magnetic recording medium is connected, is provided.

According to still another aspect of the present invention, a method for manufacturing a magnetic material in which at least one element of Cu, Ni and B is contained in a CoPt- or FePt-alloy magnetic material includes a step of depositing a magnetic material in which at least one element of Cu, Ni and B is contained in a CoPt- or FePt-alloy magnetic material with an atomic percent equal to or more than 1% and equal to or less than 40%, and a step of transforming the deposited magnetic material into an $L1_0$-ordered alloy according to annealing at a temperature equal to or lower than 500° C.

It is preferable that the above-described step of depositing a magnetic material in which at least one element of Cu, Ni and B is contained in a CoPt- or FePt-alloy magnetic material with an atomic percent equal to or more than 1% and equal to or less than 40% is a step of depositing a magnetic material in which the CoPt- or FePt-alloy magnetic material contains Ni, and at least one element of Cu and B with an atomic percent equal to or more than 1% and equal to or less than 30%.

The foregoing and other objects, advantages and features of the present invention will become more apparent from the following detailed description of the invention taken in conjunction with the accompanying drawings.

BRIEF DESCRIPTION OF THE DRAWINGS

FIG. 3A is a plan view; FIG. 3B is a cross-sectional view taken along line A-A' shown in FIG. 3A;

DETAILED DESCRIPTION OF THE INVENTION

Figure 1:
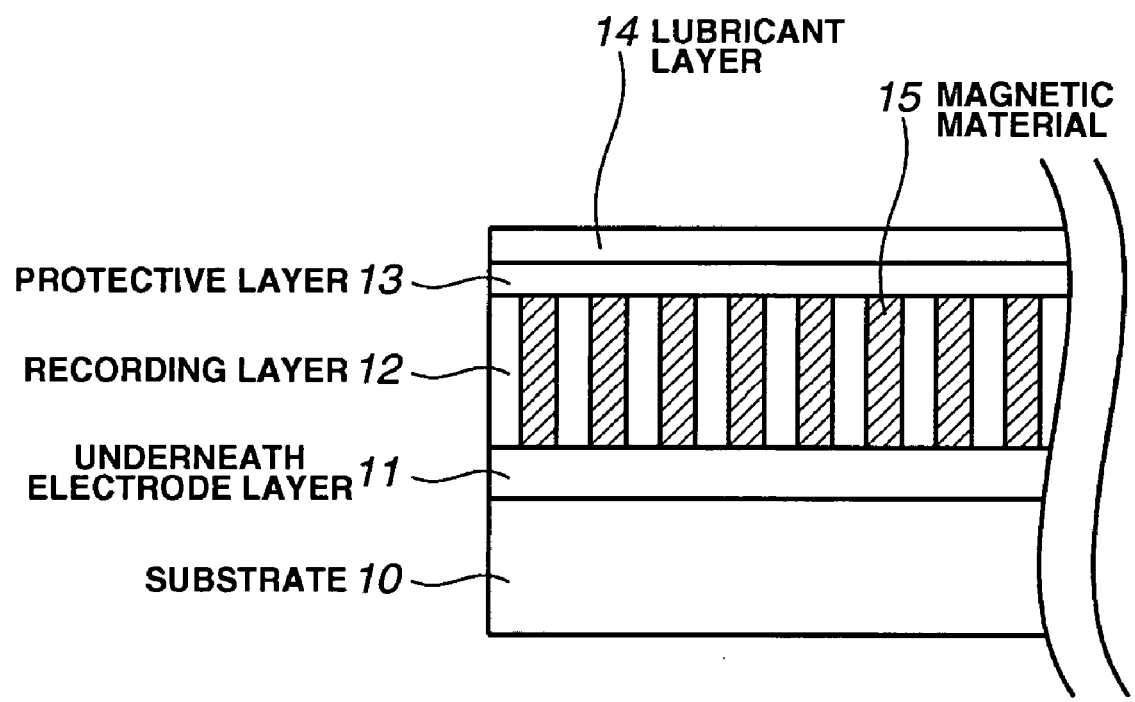
FIG. 1 is a schematic diagram illustrating a magnetic recording medium using a magnetic material according to the present invention.
Figure 2A:
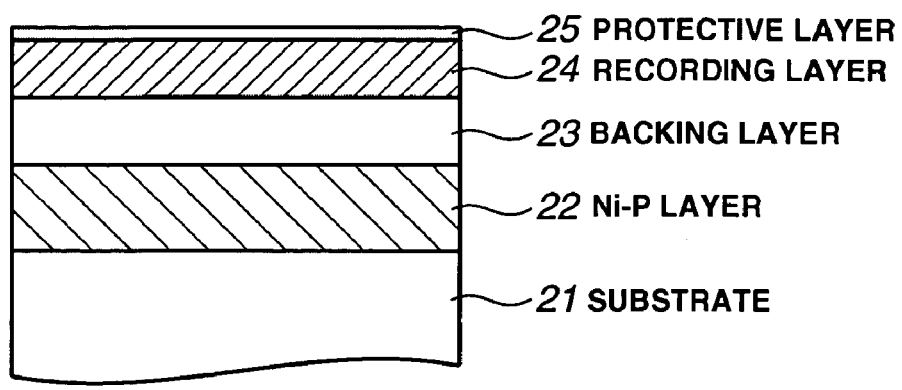
FIGS. 2A and 2B are schematic diagrams illustrating a magnetic recording medium according to a conventional technique.
Figure 2B:
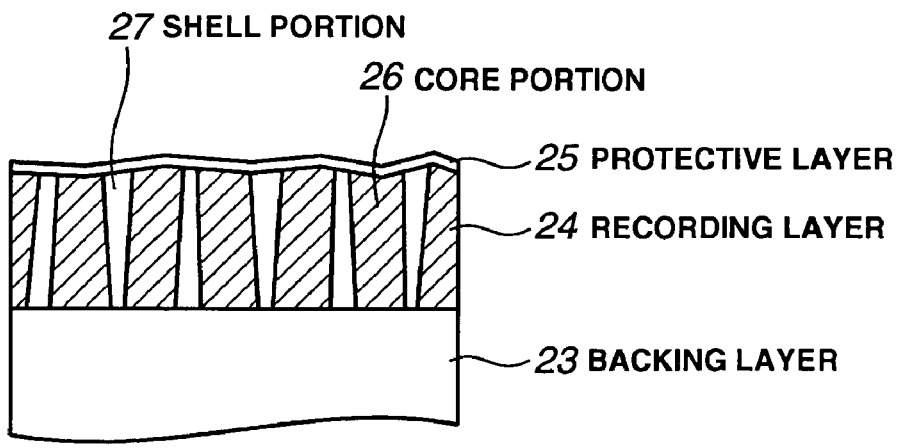

The present invention will now be described in detail.

A magnetic material according to the present invention is characterized in that in a CoPt- or FePt-alloy magnetic material obtained according to plating, at least one element of Cu, Ni and B is contained in the alloy magnetic material with an atomic percent equal to or more than 1% and equal to or less than 40%.

A description will now be provided of reduction of a temperature to transform into an $L1_0$-ordered alloy and control of magnetic anisotropy energy by adding at least one other element to a CoPt- or FePt-alloy deposited by plating.

For reducing a temperature to transform into an $L1_0$-ordered alloy, addition of at least one element of Cu, B, and the like, is effective. The amount of addition is preferably within a range of 1-40 atomic %, and more preferably, within a range of 3-20 atomic %. For effectively depositing B, it is effective to utilize eutectoid with Ni. In this case, the concentration of additive elements other than Ni is preferably within a range of 1-30 atomic %, and more preferably, within a range of 3-15 atomic %.

At that time, it is possible to reduce a temperature to transform into an $L1_0$-ordered alloy by addition of elements by at least 150° C. from a temperature to transform into an $L1_0$-ordered CoPt or FePt alloy of 600-700° C. When using the $L1_0$-ordered alloy for a magnetic recording material, it is possible to control magnetic anisotropy energy in accordance with a magnetic head.

With respect to the purity of original materials, the present invention does not exclude a case in which very small amounts of additives other than object elements are mixed. Only deposited elements will be hereinafter described when composition is not mentioned, since composition can be controlled by plating conditions, and the like.

Since eutectoid of B with Ni is possible, it is possible to form a magnetic material obtained by adding Ni to a CoPt or FePt alloy, and adding B to the obtained CoNiPt or FePtNi alloy. Trimethylamineborane is preferable as a B source, and a reducing agent containing B may also be added.

A derivative, such as sodium borohydride ($NaBH_4$), sodium hydride (NaH), dimethylamineborane (DMAB), trimethylamineborane (TMAB), pyridineborane (PyB), potassium borohydride (KBH), or the like, trimethyl borate (TMB), or the like may be used as the reducing agent.

Cobalt sulfate, cobalt chloride, cobalt sulfamate, or the like may be used as a cobalt source for a plating solution. Iron sulfate, iron chloride, iron sulfamate, or the like may be used as an iron source for a plating solution. Hexachloroplatinic acid, platinum chloride, diaminodinitrile platinum, or the like may be used as a platinum source for a plating solution. Nickel sulfate, nickel chloride, nickel sulfamate, or the like is preferable as a nickel source for a plating solution. Copper sulfate, copper chloride, copper sulfamate, or the like is preferable as a copper source for a plating solution.

A material not relating to electrodeposition may be used for adjusting pH, or the like. Such materials include boric acid, borates, citrates, such as sodium citrate, ammonium citrate, and the like, tartrates, such as ammonium tartrate, and the like.

Examples of plating solutions include 0.3 mol/l of cobalt sulfate, 0.01 mol/l of hexachloroplatinic acid, and 30 g/l of boric acid for a CoPt alloy, and 0.3 mol/l of iron sulfate, 0.01 mol/l of hexachloroplatinic acid, and 30 g/l of boric acid for a FePt alloy.

It is possible to mix an additional element in such a solution by adding copper sulfate or nickel sulfate. In order to obtain a four-element deposit, it is preferable to add 0.1 mol/l of nickel sulfate, 10 g/l of sodium citrate, and 1 g/l of trimethylamineborane to the above-described FePt-type plating solution. Any other appropriate conditions may, of course, be adopted.

The plating solution is not limited to an aqueous solution. Plating using an organic solvent may also be performed. For example, a CoPt alloy can be deposited by performing electrodeposition from a solution obtained by dissolving cobalt chloride and hexachloroplatinic acid in isopropyl alcohol.

The present invention has features in elements to be added to CoPt or FePt deposited from a plating solution according to electrodeposition. Materials for a plating solution for electrodeposition are not limited to the above-described ones.

Next, a description will be provided of a magnetic recording medium in which a magnetic material according to the present invention is filled in pores having a diameter equal to or less than 100 nm.

(Configuration of the Magnetic Recording Medium)

FIG. 1 is a schematic diagram illustrating the configuration of a magnetic recording medium in which a magnetic material according to the present invention is filled in pores. In FIG. 1, there are shown a substrate 10, an underneath electrode layer 11, a recording layer 12, a protective layer 13, a lubricant layer 14, and a magnetic material 15.

Any smooth substrate, such as a glass substrate, a quartz substrate, a silicon substrate, or the like, may be used as the substrate 10. The recording layer 12 is obtained by filling the magnetic material 15 of the present invention in a structure having pores to be described below. The filled magnetic material is an $L1_0$-ordered alloy whose c axis is preferably oriented in a direction perpendicular to the substrate 10.

Figure 3A:
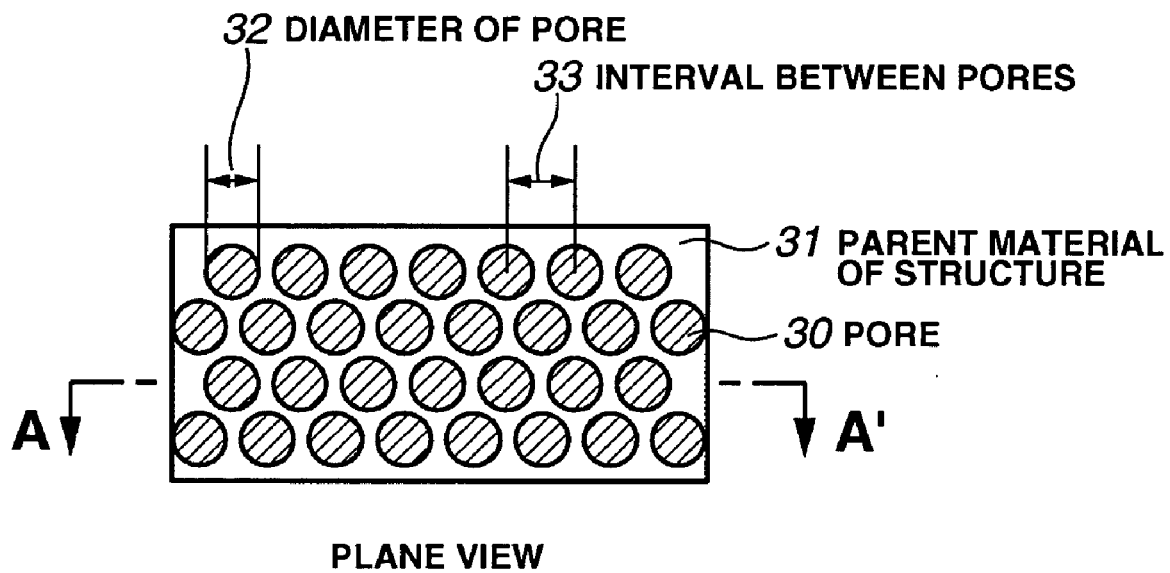
FIGS. 3A and 3B are schematic diagrams illustrating a structure having pores.
Figure 3B:
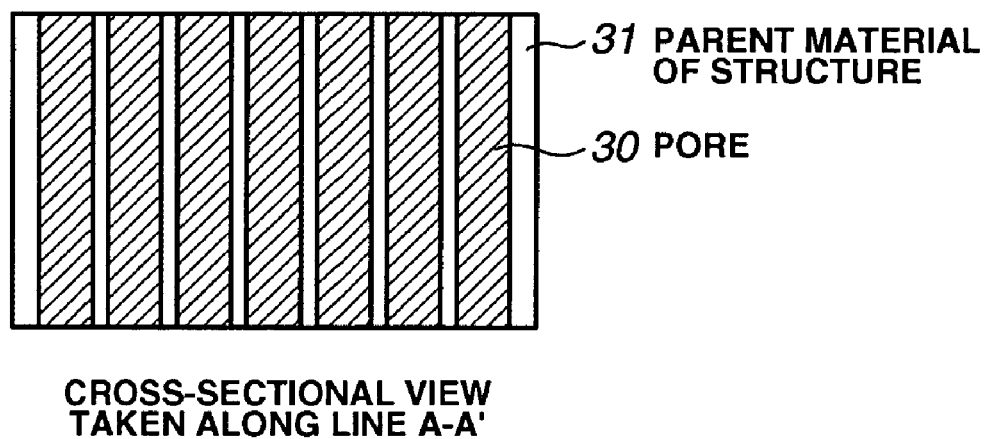

A structure shown in FIGS. 3A and 3B having pores, serving as a parent body of the recording layer 12, is formed according to a method for forming pores by anodic oxidation of aluminum, or a method for forming pores using an AlSi structure obtained by disposing silicon so as to surround a cylindrical aluminum. The details of these methods will now be described. A block copolymer structure, or the like may also be used.

Such a structure is characterized by a diameter 32 of pores and an interval 33 between pores shown in FIG. 3A. Pores comprise alumina, or silicon or silicon germanium depending on the diameter of the pores.

First, the characteristics of a structure having pores obtained by anodic oxidation of aluminum will be described. Pores are formed in a self-organizing manner by immersing a portion where pores 30 are to be formed of an aluminum film formed on the substrate 10, in an aqueous solution of phosphoric acid, oxalic acid, sulfuric acid, or the like, and applying a voltage by using the aluminum film as an anode. The interval 33 between pores formed at that time is determined by the applied voltage, such that the relationship of 2.5 nm×voltage (V) is known. However, the minimum value of the interval 33 between pores is about 10 nm. The minimum value of the diameter 32 of pores is about 8 nm.

A feature of this method is that by providing the hollows of regular array on the surface of the aluminum film, regular pores are formed starting from the recesses in the shape of a honeycomb or tetragonal prisms. This method has a great possibility for patterned media. A specific example of the above-described structure having pores obtained by anodic oxidation of aluminum is described in Japanese Patent Application Laid-Open (Kokai) No. 11-200090 (1999).

Next, a description will be provided of a structure including columnar aluminum portions having aluminum as a main component that are provided in a direction perpendicular to the substrate, and portions having Si or SiGe as a main component disposed so as to surround the columnar aluminum portions.

This structure is characterized in that the columnar aluminum portions are provided in a direction perpendicular to the substrate, and the Si or SiGe portions are disposed so as to surround the sides of the columnar aluminum portions as a parent material 31 of the structure. Si or SiGe is slightly mixed in the Al portions, and Al is slightly mixed in the Si or SiGe portions. It is preferable to form this structure by performing simultaneous film forming of Al, and Si or SiGe in a non-equilibrium state. Only the columnar Al portions can be dissolved and removed by immersing the structure in an acid or alkali, such as phosphoric acid, or the like, in which the Si or SiGe portions are not dissolved and the columnar Al portions are dissolved. For that purpose, an acid or an alkali, such as phosphoric acid, sulfuric acid, aqueous ammonia, or the like, may be used.

The columnar Al portions can also be removed by performing anodic oxidation of the AlSi or AlSiGe structure in an aqueous solution of sulfuric acid, or the like. In this case, the Si or SiGe portions are oxidized during anodic oxidation, to become $(Al_x(Si_yGe_{1-y})_{1-x})_zO_{1-z}$. The range of x may be within a range of $0<x \leq 0.2$, and preferably, within a range of $0<x \leq 0.1$. The range of y may be within a range of $0 \leq y \leq 1$, including the case of only Si, or only Ge. The state of oxidation is within a range of $0.334 \leq z \leq 1$, including the state of no-oxidation. For performing oxidation, anodic oxidation, or the like may be performed. It is preferable that the anodic oxidation is terminated 30-60 seconds after pores reach the underneath layer. Anodic oxidation may be performed until the current at anodic oxidation reaches a minimum value. Oxidation may be performed by annealing in an oxygen atmosphere.

The above-described AlSi or AlSiGe structure in which Al is removed is characterized in that the diameter of pores is within a range of 1-15 nm, and the interval between pores is within a range of 3-20 nm, depending on the composition. In the above-described method of removing Al portions, walls surrounding the pores 30 are made of Si, SiGe or an oxide of Si or SiGe.

Specific examples of the structure having Si or SiGe as a component are described in Japanese Patent Application Laid-Open (Kokai) No. 2002-340944, and the like.

The underneath electrode layer 11 is preferably made of a material satisfying a condition of resistivity $(\Omega$ cm$)$/thickness (cm)$\leq 100$ $(\Omega)$. In order to control the orientation of the underneath electrode layer 11, MgO oriented to (001) may be inserted. Particularly, in order to control the orientation of a magnetic material filling the pores, the orientation of the underneath electrode layer 11 may be selected to (111) or (001). For orienting the c axis of the $L1_0$-ordered alloy layer of the magnetic material of the invention in a direction perpendicular to the substrate, it is preferable that the underneath electrode layer 11 has crystal plane composed of tetragonal-like array parallel to the surface of the substrate. Particularly, it is preferable to utilize a (001) orientation having a fcc structure.

It is preferable to use glass, Al, carbon, plastics, Si, or the like for the substrate 10. In the case of an Al substrate, it is desirable to form a NiP film as an underneath layer according to plating or the like, in order to secure hardness.

It is effective to form a soft magnetic layer between the substrate 10 and the underneath electrode layer 11 as a backing layer. A film having $Ni_tFe_{1-t}$ as a main component can be used as the backing layer. The range of t is desirably within a range of 0.65-0.91, and Ag, Pd, Ir, Rh, Cu, Cr, P, B, or the like may be partially contained. Any other appropriate soft magnetic material, such as FeCo, FeTaC, or an amorphous material, may also be used.

The upper surface of the magnetic recording medium is subjected to precision polishing using diamond slurry, or the like. An rms (root mean square) value of projections and hollows of the surface is equal to or less than 1 nm. It is preferable to form the protective layer 13 on the surface. In order to provide wear resistance against friction with a head, it is effective to use a very hard non-magnetic material, such as carbide, nitride, or the like, as well as carbon for the protective layer 13.

It is preferable to coat PFPE (perfluoropolyether) as the lubricant layer 14. A magnetic material can be filled in the pores according to electrodeposition by disposing an electrode at the base of the pores.

The filled magnetic material can be transformed into an $L1_0$-ordered alloy by performing annealing processing at a temperature equal to or less than 500° C., and preferably, at a temperature within a range of 300-450° C.

Figure 4:
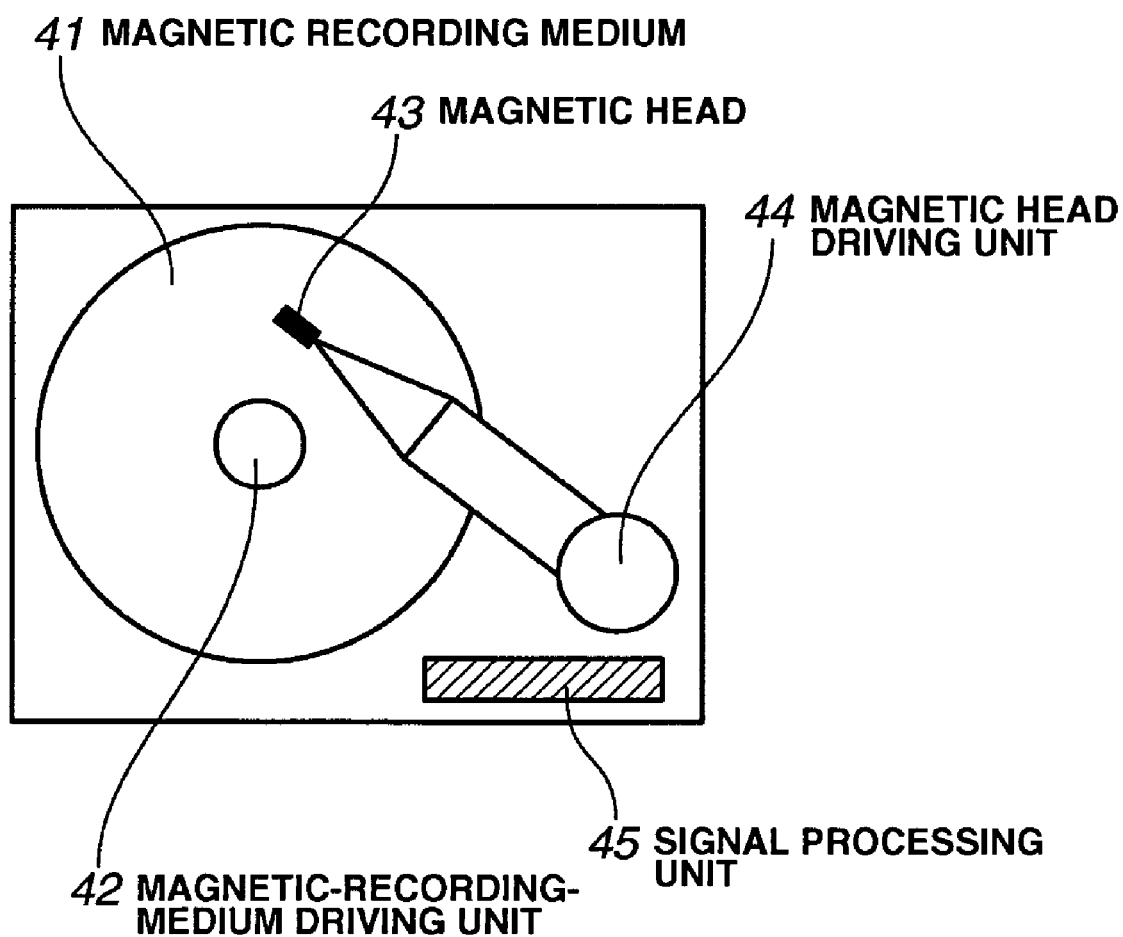
FIG. 4 is a schematic diagram illustrating a magnetic recording/reproducing apparatus using a magnetic recording medium according to the present invention.

The magnetic recording medium of the present invention is effective as a perpendicular magnetic recording medium. A magnetic recording/reproducing apparatus for the magnetic recording medium must include, as shown in FIG. 4, a read/write magnetic head 43, a magnetic-head driving unit 44, such as a motor, or the like, a signal processing unit 45, a dustproof case, and the like, in addition to a magnetic recording medium 41. In the magnetic recording/reproducing apparatus, driving of the magnetic recording medium 41 is not limited to rotation, and driving of the magnetic head 43 is not limited to circumferential sliding.

Figure 5:
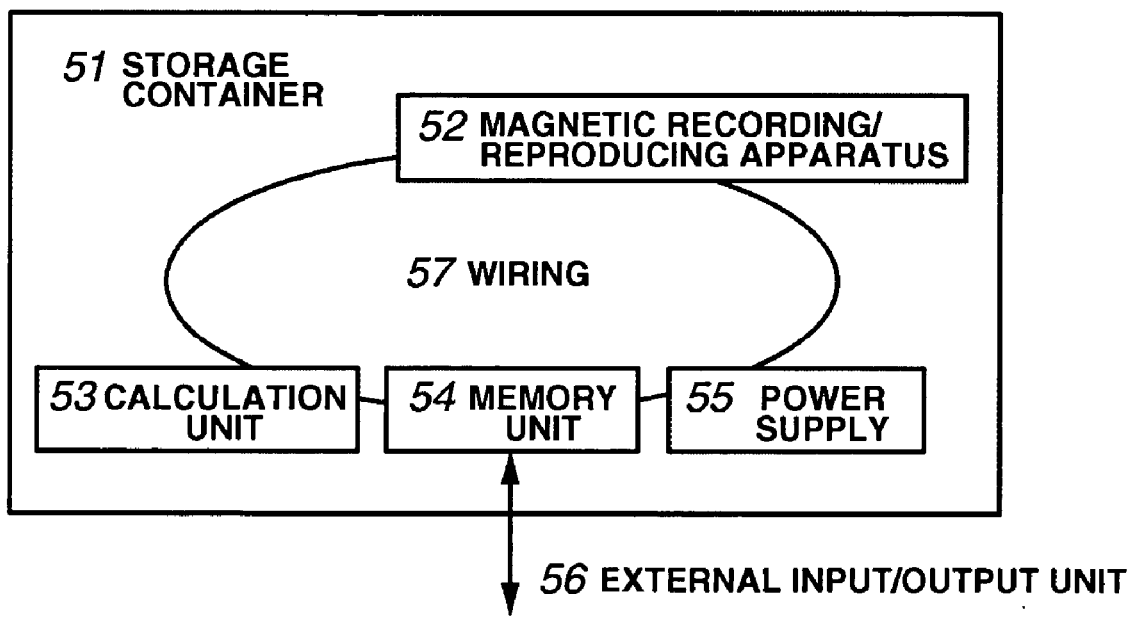
FIG. 5 is a schematic diagram illustrating an information processing apparatus using a magnetic recording/reproducing apparatus according to the present invention.

In order to use the above-described magnetic recording/reproducing apparatus as an information processing apparatus, it is necessary to form an information processing apparatus by accommodating, as shown in FIG. 5, a magnetic recording/reproducing apparatus 52, a memory unit 54, a calculation unit 53, an external input/output unit 56, a power supply 55, and wiring connecting these units within a storage container 51. In the information processing apparatus, wiring may be performed using wires or wireless.

Examples of the present invention will now be described.

EXAMPLE 1

Example 1 of the present invention relates to a three-element magnetic material including a plated CoPt- or FePt-alloy.

First, a basic plating solution for CoPt including 0.3 mol/l of cobalt sulfate, 0.01 mol/l of hexachloroplatinic acid, and 30 g/l of boric acid was prepared. Similarly, a basic plating solution for FePt including 0.3 mol/l of iron sulfate, 0.01 mol/l of hexachloroplatinic acid, and 30 g/l of boric acid was prepared. It was confirmed that CoPt and FePt were deposited from these solutions, and were transformed into $L1_0$-ordered alloys at annealing temperatures of 700° C. and 600° C., respectively, in a vacuum. However, the magnetic material of the present invention may be deposited by using any other appropriate plating solution, and components other than the above-described ones are not excluded. In addition, various combinations of materials may, of course, also be used.

By adding 0.005 mol/l of copper sulfate to the above-described basic plating solutions, deposits of $Co_{40}Cu_{10}Pt_{50}$ and $Fe_{35}Cu_{15}Pt_{50}$ were obtained. A Pt film 20 nm thick formed on a silicon substrate was used as the substrate, and electrodeposition was performed at a bath temperature of 60° C. and a current density of 1 A/dm$^2$.

By annealing the above-described deposits obtained by electrodeposition at 500° C., the deposits in which Cu was added were transformed into $L1_0$-ordered alloys whose coercive forces increased by about 40% and about 70% in the $Co_{40}Cu_{10}Pt_{50}$ and $Fe_{35}Cu_{15}Pt_{50}$, respectively, and have coercive forces equal to or more than 3 kOe. It was also cleared that magnetic anisotropy energy was at least 10$^6$ erg/cc.

Accordingly, it can be confirmed that the temperature to transform into an $L1_0$-ordered alloy can be reduced by adding the third element Cu to CoPt or FePt deposited according to plating. It is also possible to reduce the temperature to transform into an $L1_0$-ordered alloy and adjust the values of the coercive force and magnetic anisotropy energy by adding any other appropriate element.

EXAMPLE 2

Example 2 of the present invention relates to a four-element magnetic material including a plated CoPt- or FePt-alloy.

A new plating solution was prepared by adding 0.1 mol/l of nickel sulfate, 10 g/l of sodium citrate, and 1 g/l of trimethylamineborane to the basic plating solution for each of CoPt and FePt described in Example 1.

Composition analysis cleared that Ni and B were added to the CoPt and FePt to form respective four-element alloys. For effectively adding B, eutectoid with Ni is effective. A Pt film 20 nm thick formed on a silicon substrate was used as the substrate, and electrodeposition was performed at a bath temperature of 60° C. and a current density of 1 A/dm$^2$.

By annealing the above-described deposits obtained by electrodeposition at 500° C., the deposits were transformed into $L1_0$-ordered alloys whose coercive forces increased by about 35% and about 70% in $Co_{30}Ni_{20}Pt_{46}B_4$ and $Fe_{28}Ni_{22}Pt_{45}B_5$, respectively, and have coercive forces equal to or more than 3 kOe. It was also cleared that magnetic anisotropy energy was at least 10$^6$ erg/cc. Accordingly, it can be confirmed that the temperature to transform into an $L1_0$-ordered alloy can also be reduced by making CoPt or FePt deposited according to plating into a four-element alloy. It is also possible to reduce the temperature to transform into an $L1_0$-ordered alloy and adjust the values of the coercive force and magnetic anisotropy energy by adding any other appropriate element. It is important that the effects of eutectoid can be utilized.

EXAMPLE 3

Example 3 of the present invention relates to a magnetic recording medium using a magnetic material according to the present invention.

A doughnut-shaped glass substrate was prepared, and a MgO film 10 nm thick having (001) orientation in a direction perpendicular to the substrate, a Pt film 20 nm thick having (001) orientation, serving as the underneath electrode layer, and an AlSi structure 30 nm thick formed from a sputtering target having a composition ratio of 56% of Al and 44% of Si were successively formed according to sputtering. The AlSi structure is characterized in that Si portions surround cylindrical aluminum portions.

In order to form pores by removing the aluminum portions of the AlSi structure, the structure was immersed into 2.8 mol % of aqueous ammonia for 10 minutes at the room temperature. At that time, the Pt surface having (001) orientation is exposed at the base of pores. By removing the aluminum portions, a structure as shown in FIGS. 3A and 3B was obtained. In Example 3, the diameter of pores was 8 nm, and the interval between pores was 10 nm.

Then, a magnetic material according to the present invention is filled in the pores. A plating solution including 0.3 mol/l of iron sulfate, 0.05 mol/l of nickel sulfate, 0.03 mol/l of hexachloroplatinic acid, 30 g/l of boric acid, 10 g of sodium citrate, and 1 g/l of trimethylamineborane was used. The above-described substrate was immersed into this plating solution, and plating was performed with a current density of 1 A/dm$^2$ at 60° C. The result of analysis confirmed that a four-element magnetic material of $Fe_{28}Ni_{22}Pt_{45}B_5$ was obtained by plating. Then, by annealing the material at 400° C. for one hour in a vacuum, the material was transformed into an $L1_0$-ordered alloy.

Finally, the four-element magnetic material portions had a c-axis orientation in a direction perpendicular to the substrate, and was transformed into an $L1_0$-ordered alloy. The coercive force was 4.5 kOe in a direction perpendicular to the substrate. As a result of observation of the structure, the four-element magnetic material portions has a diameter of 8 nm, and the average distance between the magnetic material portions was 10 nm. It was confirmed that the magnetic material portions were separated by non-magnetic material portions having Si as a main component. Accordingly, the structure of Example 3 in which a hard magnetic material is uniformly dispersed satisfies a required structure as a magnetic recording medium.

EXAMPLE 4

In Example 4 of the present invention, a magnetic recording apparatus having a configuration as shown in FIG. 4 is provided. In FIG. 4, a magnetic recording medium 41 of the present invention is incorporated in the magnetic recording apparatus that includes a magnetic-recoding-medium driving unit 42, a magnetic head 43, a magnetic-head driving unit 44, and a signal processing unit 45. In Example 4, driving of the magnetic recording medium 41 is not limited to rotation, and driving of the magnetic head 43 is not limited to circumferential sliding.

EXAMPLE 5

Example 5 of the present invention relates to an information processing apparatus. The magnetic recording/reproducing apparatus 52 shown in FIG. 5 that has been described in Example 4 can input and output information. Hence, as shown in FIG. 5, it is possible to form an information processing apparatus obtained by accommodating the magnetic recording/reproducing apparatus 52, the memory unit 54, the calculation unit 53, the external input/output unit 56, the power supply 55, and the wiring 57 interconnecting these units in the storage container 51.

According to the present invention, it is possible to reduce a temperature to transform into an $L1_0$-ordered alloy by adding new elements to a CoPt- or FePt-alloy magnetic material obtained according to plating. It is possible to provide a magnetic recording medium that is effective for high-density recording, by combining the above-described magnetic material with a structure having pores.

According to the present invention, it is possible to provide a magnetic recording/reproducing apparatus using a magnetic recording medium having the above-described magnetic material, and an information processing apparatus connected to the magnetic recording/reproducing apparatus using a magnetic recording medium having the above-described magnetic material.

The individual components shown in outline or designated by blocks in the drawings are all well known in the magnetic material, magnetic recording medium, magnetic recording/reproducing apparatus and information reproducing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A magnetic material comprising:
   a CoPt- or FePt-alloy magnetic material,
   wherein said magnetic material comprises an $L1_0$-ordered alloy, and at least one element of Cu, Ni and B is contained in said alloy magnetic material with an atomic percent equal to or more than 1% and equal to or less than 40%.

2. A magnetic material according to claim 1, wherein said CoPt- or FePt-alloy magnetic material contains Ni, and at least one element of Cu and B with an atomic percent equal to or more than 1% and equal to or less than 30%.

3. A magnetic material according to claim 1, wherein said magnetic material has a coercive force equal to or more than 3 kOe.

4. A magnetic recording medium comprising:
   a magnetic material according to claim 1 filled in pores having a diameter equal to or less than 100 nm.

5. A magnetic recording/reproducing apparatus using a magnetic recording medium according to claim 4.

6. An information processing apparatus to which a magnetic recording/reproducing apparatus that uses a magnetic recording medium according to claim 4 is connected.

7. A method for manufacturing a magnetic material in which at least one element of Cu, Ni and B is contained in a CoPt- or FePt-alloy magnetic material, said method comprising:
   a step of depositing a magnetic material in which at least one element of Cu, Ni and B is contained in a CoPt- or FePt-alloy magnetic material with an atomic percent equal to or more than 1% and equal to or less than 40%, from a plating solution; and
   a step of transforming the deposited magnetic material into an $L1_0$-ordered alloy by annealing at a temperature equal to or lower than 500 C.°.

8. A method according to claim 7, wherein said step of depositing a magnetic material in which at least one element of Cu, Ni and B is contained in a CoPt- or FePt-alloy magnetic material with an atomic percent equal to or more than 1% and equal to or less than 40% comprises a step of depositing a magnetic material in which the CoPt- or FePt-alloy magnetic material contains Ni, and at least one element of Cu and B with an atomic percent equal to or more than 1% and equal to or less than 30%.

9. A magnetic material comprising:
   a FePt-alloy magnetic material,
   wherein said magnetic material comprises an $L1_0$-ordered alloy, and at least one element of Cu, Ni and B is contained in said alloy magnetic material with an atomic percent equal to or more than 1% and equal to or less than 40%.

10. A magnetic material consisting of:
    a CoPt- or FePt-alloy magnetic material which is $L1_0$-ordered alloy, and
    at least one element of Cu, Ni and B which is contained in said alloy magnetic material with an atomic percent equal to or more than 1% and equal to or less than 40%.

* * * * *

UNITED STATES PATENT AND TRADEMARK OFFICE
CERTIFICATE OF CORRECTION

PATENT NO. : 7,286,324 B2 Page 1 of 1
APPLICATION NO. : 10/813005
DATED : October 23, 2007
INVENTOR(S) : Nobuhiro Yasui et al.

It is certified that error appears in the above-identified patent and that said Letters Patent is hereby corrected as shown below:

ON THE TITLE PAGE [54]:

Title, "IRON-PLANTINUM" should read --IRON-PLATINUM--.

COLUMN 1:

Line 1, "IRON-PLANTINUM" should read --IRON-PLATINUM--.

Signed and Sealed this

Seventeenth Day of June, 2008

JON W. DUDAS
*Director of the United States Patent and Trademark Office*